April 14, 1942.   J. F. STANFORD   2,279,799
NOISE MAKER FOR HOLLOW TOYS
Filed Dec. 17, 1940
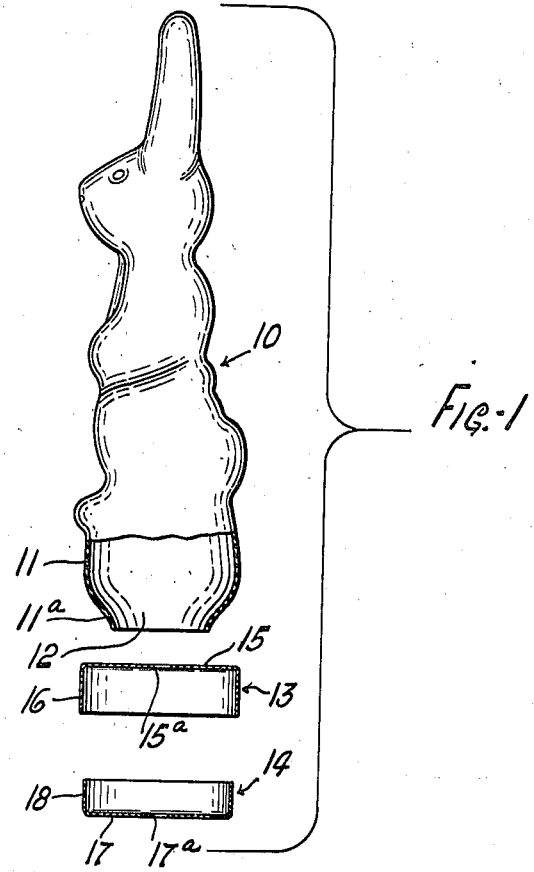
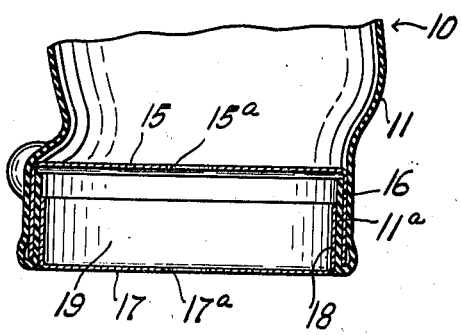
INVENTOR:
JAMES F. STANFORD
BY Ralph Barrow,
ATTORNEYS.

Patented Apr. 14, 1942

2,279,799

UNITED STATES PATENT OFFICE 2,279,799

NOISE MAKER FOR HOLLOW TOYS

James F. Stanford, Cuyahoga Falls, Ohio, assignor to Selden W. Anderson, doing business as Anderson Rubber Company, Akron, Ohio Application December 17, 1940, Serial No. 370,481

3 Claims. (Cl. 46—117)

This invention relates to noise makers, particularly for use in hollow rubber character toys, or the like.

An object of the invention is to provide a noise maker of simple, inexpensive construction adapted, for example, to be firmly secured in dipped rubber character toys at minimum cost for labor.

Another object of the invention is to provide a noise making device which may be firmly and safely secured in a dipped rubber or like hollow toy by simply assembling the parts of the device in the toy, without tools being required, and without the necessity of using additional adhesive materials or fastening means for holding parts together or for securing the device in the toy.

Another object of the invention is to provide a noise maker of the character described which may be utilized as a supporting base for the toy.

These and other objects of the invention will be manifest from the following brief description and the accompanying drawing.

Of the accompanying drawing:

Figure 1 is a cross-sectional explosion view, partly broken away and in section, illustrating the parts of a noise maker, embodying the invention, and a hollow rubber character doll in the relationship in which they are assembled.

Figure 2 is a fragmentary cross-section, greatly enlarged, illustrating the noise maker assembled in the doll.

Referring particularly to Figure 1 of the drawing, the numeral 10 designates a hollow rubber character doll of a type which is formed, for example, by dipping a suitable form in latex, or other aqueous dispersion of rubber, in a known manner. The doll 10 may have formed at its lower end, an outwardly extending tubular skirt 11, defining an aperture 12 communicating with the interior of the doll, a portion of skirt 11 preferably being tapered toward the edge thereof, at 11a.

The improved noise maker may comprise two substantially cup-shaped members 13 and 14, formed of relatively stiff material, such as thin sheet metal. More specifically, member 13 may be formed with a flat disc portion 15 and an annular marginal flange 16 extending substantially at right angles to said disc, flange 16 being of slightly larger diameter than the inside diameter of skirt 11, so that it may be yieldingly retained in the opening of the skirt during the process of assembling the noise maker in doll 10. The member 14 is similarly formed with a flat disc portion 17 and an annular flange 18, at right angles thereto, the outside diameter of flange 18 being less than the inside diameter of flange 16 of member 13 to provide clearance equal to or slightly less than the wall thickness of skirt 11 for purposes to be described. The disc portions 15 and 17 of members 13 and 14 are provided with central openings 15a and 17a, respectively.

In assembling the noise maker in doll 10, member 13 is inserted within skirt 11, inwardly of tapered portion 11a, with flange 16 of the member extended outwardly, the elasticity of the skirt yieldingly holding member 13 in given position. Next, the member 14 is inserted into the larger member 13, with flange 18 extended inwardly in telescoped relation to flange 16 of said member 13, so as to wedge the skirt portion 11a between said flanges, and with the disc portions 15 and 17 of the respective members in spaced relation to form a chamber 19, as shown in Figure 2. The complete assembling operation may be accomplished without the use of tools of any kind, and without requiring adhesives or other securing means for holding the parts together in the doll the gripping action of the rubber on the flanges 16 and 18 being effective to secure the cup-shaped members to each other and to the doll. As shown in Figure 2, the construction of the noise maker is such that it provides a satisfactory flat-bottomed base for supporting the doll.

In the use of the noise maker, the doll 10 is depressed to force air through the openings 15a and 17a, in the members 15 and 17, respectively, as well as through chamber 19, thereby causing a squawking or whistling noise. When the doll is released to permit it to resume normal shape, the resulting inrush of exterior air through openings 17a and 15a causes the squawking noise to be repeated.

It has been found by actual test that noise makers incorporated into toys in accordance with the present invention are so firmly held therein that they cannot possibly become loose, regardless of how much abuse the toy receives in ordinary use.

Modifications of the invention may be resorted to without departing from the spirit thereof or the scope of the appended claims.

What is claimed is:

1. The combination of a hollow rubber article having an aperture therein, and a noise maker comprising a first cup-shaped member having a peripheral flange, and a second cup-shaped member having a peripheral flange inserted within the flange of said first member to provide a chamber between the members, there being a clearance provided between the flanges of the respective members substantially equal to or less than the thickness of the aperture edge portions of said hollow article, said second member being secured to said first member by the members being pressed together with said aperture edge portions of said article tightly engaged between the flanges of the respective members, the gripping action of the rubber on said flange securing the cup-shaped members to each other, said members having cooperating openings therein communicating with said chamber for producing sound by passage of air through said cooperating openings.

2. The combination of a hollow rubber article having an aperture therein, and a noise maker comprising a first cup-shaped member having a peripheral flange, and a second cup-shaped member having a peripheral flange inserted within the flange of said first member to provide a chamber between the members, there being a clearance provided between the flanges of the respective members substantially equal to or less than the thickness of the aperture edge portions of said hollow article, said second member being secured to said first member by the members being pressed together with said aperture edge portions of said article tightly engaged between the flanges of the respective members, the gripping action of the rubber on said flange securing the cup-shaped members to each other, one of said members having a substantially flat face to provide a supporting base for said article, said members having cooperating openings therein communicating with said chamber for producing sound by passage of air through said cooperating openings.

3. The combination of a hollow rubber or like article having an aperture therein for a noise making device, and a noise maker comprising a first member formed with a disc portion and an out-turned annular flange, a second member formed with a disc portion and an out-turned annular flange, the diameter of the flange of one of said members being smaller than the other to be insertable therein in telescoped relation to provide a chamber between the members, clearance being provided between said annular flanges of the respective members substantially equal to or less than the thickness of the portions of said article adjacent said aperture therein, said members being secured together and also secured in the aperture of said member by being pressed together with the flanges thereof in telescoped relation with said aperture edge portions of the article tightly engaged between the flanges of the respective members, the gripping action of the rubber on said flange securing the cup-shaped members to each other, said members having cooperating openings therein for producing sound by forced passage of air therethrough, one of said members having said disc portion thereof substantially flat to provide a supporting base for the article.

JAMES F. STANFORD.